May 20, 1958     D. J. HERMES     2,835,055
POWER TRENCHER

Filed June 4, 1956     2 Sheets-Sheet 1

INVENTOR.
D. J. HERMES

BY

ATTORNEY

May 20, 1958     D. J. HERMES     2,835,055
POWER TRENCHER
Filed June 4, 1956     2 Sheets-Sheet 2
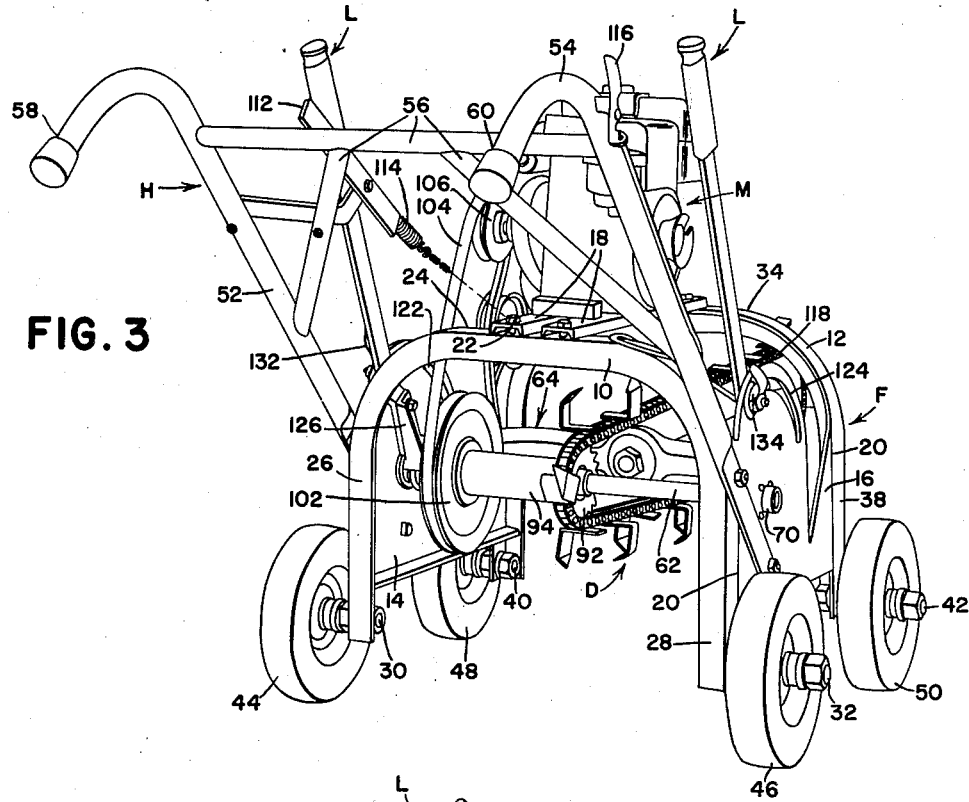
FIG. 3
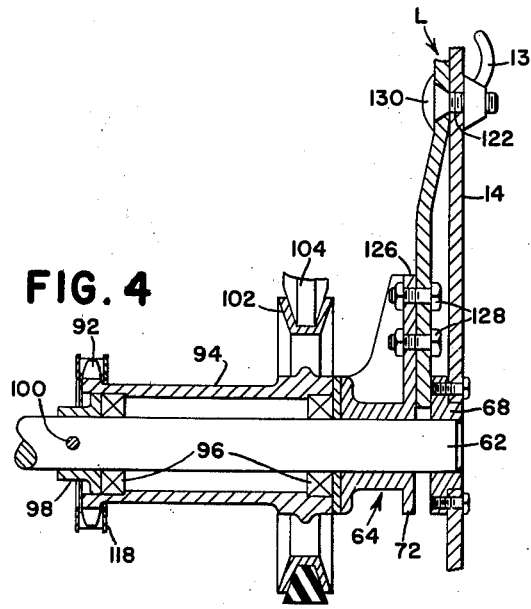
FIG. 4
FIG. 5
INVENTOR.
D. J. HERMES
BY 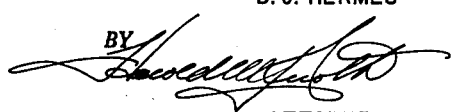
ATTORNEY

United States Patent Office

2,835,055
Patented May 20, 1958

2,835,055

POWER TRENCHER

Dale J. Hermes, East Moline, Ill., assignor to Stampings, Inc., Davenport, Iowa, a corporation of Iowa Application June 4, 1956, Serial No. 589,288

8 Claims. (Cl. 37—86)

This invention relates to a portable earth-working machine and more particularly to a power-driven, preferably manually propelled and guided machine for digging relatively narrow trenches for the installation of fuel and water lines, electrical cables and the like.

The invention has for a significant object the provision of a relatively light-weight but rugged portable machine that may be easily maneuvered, inexpensively produced and economically operated and maintained. It is an important object to afford a simple arched frame which straddles and supports at one end an elongated digger that includes rotary elements at opposite ends and an endless digger chain trained about said means. The invention features mounting the digger so that it may be readily adjusted to any desired depth, preferably by allowing the digger to power its way to a selected depth and by then locking the digger at that depth. Other features reside in a stable mobile frame, a machine that may not only be operated by one man but may be easily loaded and unloaded from a truck or the like by one man for transport from job to job, and a machine that is adapted to operate in limited areas where it would be impossible to bring in a larger machine, thus eliminating the manual labor of digging trenches, which trenches are necessarily oversize because of the size of the shovels, the present machine, because power driven, being able to employ extremely narrow digging lugs which not only operate more efficiently by moving less dirt but render the back-filling job simpler and more expedient.

The foregoing and other desirable objects and important features inherent in and encompassed by the invention will become apparent as a preferred embodiment thereof is disclosed, by way of example, in the annexed specification and accompanying sheets of drawings, the several figures of which are described immediately below.

Figure 3 is a three-quarter front perspective of the machine.

Figure 4 is a section, on an enlarged scale, as seen along the line 4—4 of Figure 1.

Figure 5 is an enlarged section on the line 5—5 of Figure 1.

Figure 1:
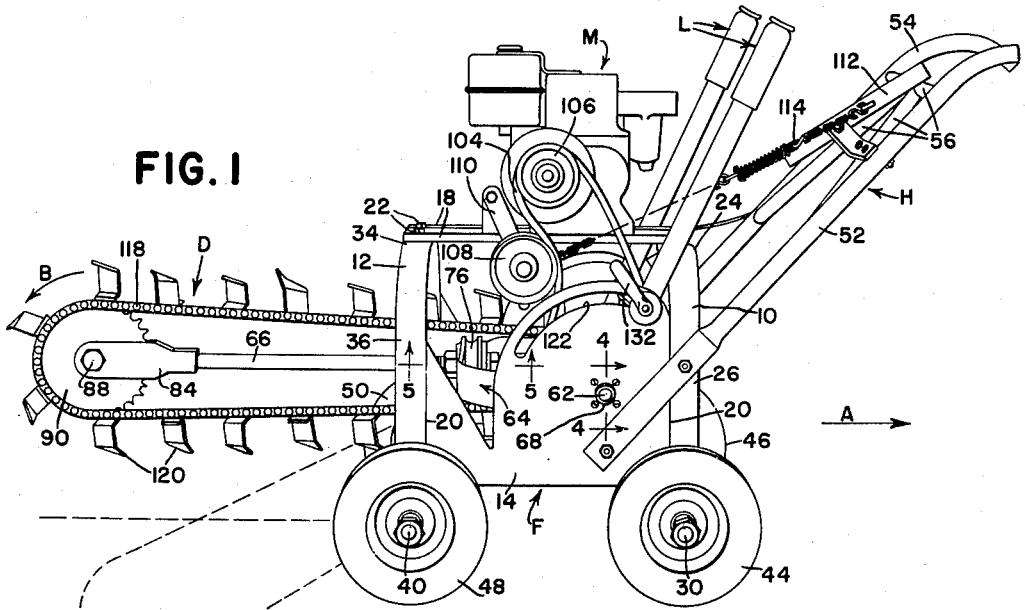
Figure 1 is a side perspective of the machine, illustrating in dotted lines a typical digging position.
Figure 2:
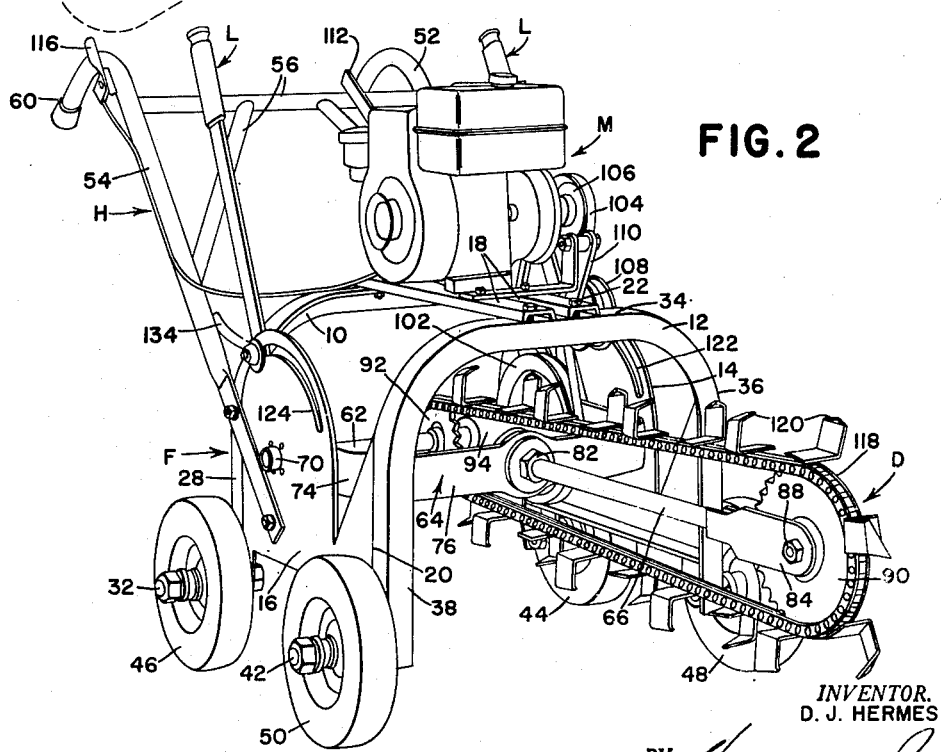
Figure 2 is a three-quarter rear perspective of the machine.

The machine comprises, briefly and broadly, a fore-and-aft mobile main frame F, earth-working or trench-digging means D carried by the frame, a power source or motor M for driving the earth-working means, handle means H for moving and guiding the machine, and levers L for controlling the raising and lowering of the earth-working means D. The normal direction of travel of the machine when operating is indicated by the arrow A in Figure 1. Hence, the expressions "front," "rear" etc. as used here and in the appended claims will be employed with reference to direction of travel, it being understood of course that these are terms of convenience and not of limitation.

The main frame F is of rigid tunnel-like structure, having front and rear arches 10 and 12, respectively, opposite side members or plates 14 and 16, and a top element made up of a pair of sills 18 on which the motor M is carried. This motor may be, as shown, a conventional internal-combustion engine of adequate rating. Each arch is conveniently constructed of angle stock and the side plates are rigidly joined to the fore-and-aft webs or flanges of the angles by welding, as along junction lines 20. The top sills 18 are shown as being secured to the arches by bolts 22. The front arch 10 has a transverse top portion 24, to which the front ends of the top sills 18 are secured, and depending legs 26 and 28, the lower ends of which terminate in a common horizontal plane and respectively have stub axles 30 and 32 secured thereto. The rear arch is symmetrically formed, having a top portion 34 and depending legs 36 and 38 which respectively have stub axles 40 and 42 joined thereto. The axes of the axles are horizontally coplanar so that the ground-engaging means, here four rubber-tired wheels 44, 46, 48 and 50, journaled respectively thereon are of uniform diameter. The four wheels are used in the interests of stability and moreover are significant in that the axles are not continued across the frame but instead, at each side of the frame, project laterally outwardly to dispose the respective wheels outwardly of the frame sides, whereby the maximum lateral and vertical clearance within the tunnel-like structure is obtained, consistent with the intended purposes of the machine, particularly since the frame straddles the earth-working element or trench-digging means D, the details of which will be covered below.

As previously set forth, the side members are respectively steel plates, and the handle means includes a pair of upwardly and forwardly extending identical bars 52 and 54, rigidly but receivably secured to these plates and adequately cross-braced as at 56 and having convenient hand grips 58 and 60 which may be easily held by a walking attendant, whose normal position will be ahead of the machine but facing rearwardly so that he walks backwards while observing the action of the digger D. As will be brought out below, the digger or trench-forming element D is driven so that it travels in the direction of the arrow B.

The mounting means for the digger D comprises a cross shaft 62, a yoke 64 and a main rigid arm or beam 66. The cross shaft 62 has its opposite ends mounted in supports 68 and 70 respectively in the side plates 14 and 16, the mounting being preferably such that the shaft is stationary. The yoke 64 may be conveniently and economically constructed as a casting, although this is not necessary, and has opposite fore-and-aft legs 72 and 74 and a transverse midportion 76. The legs are rockably mounted on the cross shaft 62 (Figure 4) and the midportion 76 has a fore-and-aft internally threaded bore 78 (Figure 5) into which the threaded front end 80 of the main arm 66 is received. Stop nuts 82 are threaded on the front end of the main arm ahead of and behind the yoke midportion and rigidly mount the arm and also to afford means for effecting fore-and-aft adjustment of the arm as well as means for alining the arm in a vertical plane as respects a fork 84 rigid on its end. Washers 86 are shown as interposed between the nuts 82 and opposite faces of the yoke midportion 76. The main arm 66 is adequately constructed to stand up under extreme bending and compressional loads.

The fork 84 at the rear end of the arm, which arm extends longitudinally or rearwardly beyond the main frame F as shown, carries a transverse shaft 88 for journalling a rotary means or sprocket member 90. This sprocket is in fore-and-aft alinement with a front rotary means or sprocket 92 journaled on the cross shaft 62 by means of being coaxially secured to or integral with a sleeve 94, mounted on the cross shaft by suitable bearings as at 96 (Figure 4). The sleeve is next adjacent to the left leg 72 of the yoke 64 and is held against axial displacement away from that leg by a collar 98 and pin 100, which arrangement is illustrative only and does not exclude others, since these details do not limit the invention. Also coaxially secured to or integral with the sleeve 94 is a drive member in the form of a V-belt sheave 102 which forms part of drive means between the motor M and the trench-forming element or digger D, other parts of this drive means including a V-belt 104 trained about the sheave 102 and about a motor-driven sheave 106. An idler 108 engages the belt 104 and is mounted on a swingable arm 110, the position of which is controlled by a control lever 112 on the handle means H, and interconnecting spring-loaded linkage 114, whereby the idler is selectively operative to tighten and relax the belt and thus serves as a clutch, as is conventional. When the lever 112 is thrown rearwardly, the idler moves in the same direction to relax the belt 104 and disengage the drive to the digger element D. The opposite side of the handle means H carries a suitable throttle lever 116 for the motor M.

A trencher or digger chain or equivalent endless element 118 is trained about the sprockets 90 and 92 and is equipped with digging lugs 120 of relatively narrow lateral dimension and especially formed and hardened to cut efficiently and to discharge earth laterally to opposite sides of the trench formed thereby. The sprockets are preferably of the self-cleaning type and thus avoid clogging even in moist soil. The lugs are staggered as to lateral offset so that one lug throws to one side and its following lug throws to the other and so on, thus distributing the soil evenly at both sides of the trench to facilitate both digging and backfilling. The staggered offset further improves the ability of the machine to follow the course along which it is guided, with no unbalance or side thrust.

It was previously stated that the direction of travel of the trencher chain 118 is in the direction of the arrow B and that the cross shaft 62 constitutes a transverse pivot for the unit made up of the yoke 64, main arm 66 and digger element D. Hence, if the unit just described is allowed freedom of vertical movement while the main frame F is immobilized, the chain and lugs will dig themselves into the earth to a depth limited only (theoretically) by the length of the arm 66. Therefore, the digger may power itself to a depth adequate for all types of installation for which the machine is designed, and, because of means to be presently described, this depth is controllable at the will of the operator.

The means just referred to comprises releasable means for securing a selected position of the digger D as it moves through its fore-and-aft upright plane about the pivot established by the cross shaft 62. For this purpose, the side plates respectively have arcuate slots 122 and 124 concentric about the cross shaft axis. As best shown in Figure 4, the leg 72 of the yoke 64 has fixed thereto or integral therewith a generally upstanding adjusting arm 126 to which the proximate lever L is secured as by bolts 128. These levers extend into convenient proximity to the handle means H. The clamp means for the lever of Figure 4 comprises a bolt 130, which is carried by the lever and which passes through the slot 122, and a tail nut 132 threaded onto the bolt at the outer side of the plate so as to be conveniently accessible to the operator. This nut may be tightened as shown to compel the lever L into engagement with the plate 14 for establishing a friction lock. This arrangement is duplicated at the other side of the machine as will be apparent from the presence of the slot 124 and a tail nut 134.

Because of its light-weight construction, the machine may be readily transported from job to job and its initial low cost and ease of operation quite easily justify its acquisition as a replacement for the extreme manual labor of digging small trenches by hand. In operation, as already suggested, the machine is located as to site, the tail nuts 132 and 134 released, the motor started and clutch engaged, and the digger D is allowed to power itself to the depth desired while the frame is immobilized, after which the operator secures the adjusted position by tightening the tail nuts. He may if he desires retard the digging in phase by holding back on one or both levers, in which respect it should be observed that since both levers are rigidly secured to the yoke, either may be used, depending upon which side of the machine the operator is standing or depending upon whether he is right or left handed.

The operator preferably walks backwards, facing the digger D and guiding the machine via the handle means H, in which position he can readily observe the progress of the work and has solid ground on which to walk; i. e., he does not have to be concerned with stepping in the trench as he would were he following the machine. Moreover, the direction of travel of the digger D as respects the direction of travel of the machine prevents the digger D from climbing and eliminates the tendency of the machine to run away from the attendant. Since the arched frame is skeletal or of open work construction, the working parts are easily visible to the attendant. At the end of the trench, the operator may readily disengage the drive and, after loosening the tail nuts 132 and 134, may easily raise the digger D to a transport position by means of the levers L. Transport position may be secured by again tightening one or both tail nuts. Normally, one will hold for transport. The ability of the digger to cut narrow ditches rapidly, neatly and efficiently eliminates customer objection to tearing up of lawns by unnecessarily wide hand-dug trenches. The machine is simple, safe and economical and its construction enables it to be readily shipped either completely assembled or knocked-down. The machine has particular utility in rural areas for the installation of underground LP gas lines and the like and performs a neat professional job in virtually any circumstances.

Features and advantages not specifically enumerated herein will undoubtedly occur to those versed in the art, as will numerous alterations in the preferred construction and design shown, all of which may be achieved without departure from the spirit and scope of the invention.

What is claimed is:

1. A mobile earth-working machine comprising: a fore-and-aft main frame of tunnel-like structure including front and rear arch members, opposite fore-and-aft side plates rigidly joined to the legs of the arch members, and a top element extending fore-and-aft and rigidly connected to the tops of the arch members; four stub axles, one joined to and projecting laterally outwardly from the lower end of each arch member leg; four ground wheels mounted respectively on the axles; handle means secured to the main frame and extending forwardly beyond the front arch member; a cross shaft supported at opposite ends in the side plates; a yoke between the side plates and having opposite fore-and-aft legs mounted on the cross shaft and further having a rigid transverse midportion behind the shaft; a rigid main arm joined to the midportion of the yoke and extending rearwardly therefrom; front and rear spockets rotatably carried respectively on the cross shaft and on the rear end of the main arm; earth-working means including a chain trained about the sprockets; a power source carried on the top element; and drive means interconnecting the power source and the front sprocket.

2. The invention defined in claim 1, in which: the cross shaft mounts the yoke for vertical swinging of the yoke, main arm and earth-working means about the axis of said shaft as a pivot; said yoke has an adjusting arm thereon proximate to one side plate; said one side plate has an arcuate slot thereon having said cross shaft axis as its center; and clamp means passes through said slot and is cooperative between the adjusting arm and said one side plate to secure selected adjusted positions of said yoke, main arm and earth-working means within the arcuate length of said slot.

3. The invention defined in claim 1, including: a lever rigidly secured to the yoke and extending upwardly and forwardly and proximate to the handle means for effecting manual adjustment of the yoke, main arm and earth-working means.

4. The invention defined in claim 1, in which: the main arm is connected at its front end to the midportion of the yoke by means enabling fore-and-aft adjustment of said main arm to adjust the tension of the chain.

5. The invention defined in claim 1, in which: the cross shaft is fixed to the side plates; the legs of the yoke are rockably mounted on the cross shaft; the front sprocket includes a coaxial sleeve rotatable therewith and journaled on the cross shaft; and the drive means includes an input member coaxially secured to the sleeve and driven by the power source.

6. A mobile earth-working machine comprising: a fore-and-aft main frame of tunnel-like structure including front and rear arch members, opposite fore-and-aft side members rigidly joined to the legs of the arch members, and a top element extending fore-and-aft and rigidly connected to the tops of the arch members; ground wheels mounted on and sustaining the frame; handle means secured to and for guiding the main frame; a cross shaft supported at opposite ends in the side members; a yoke between the side members and having opposite fore-and-aft legs mounted on the cross shaft and further having a rigid transverse midportion, said midportion having an aperture therethrough normal to said cross shaft; an elongated rigid main arm having a yoke-proximate end received in the midportion aperture and extending rearwardly therefrom, said yoke-proximate end being threaded; nut means threaded on said end at opposite sides of said midportion for adjustment of said arm fore-and-aft relative to the yoke; front and rear rotary means rotatably carried respectively on the cross shaft and on the rear end of the main arm; earth-working means including an endless element trained about the two rotary means; a power source carried on the frame; and drive means interconnecting the power source and the earth-working means.

7. A mobile earth-working machine, comprising: a fore-and-aft main frame of tunnel-like structure including front and rear arch members, opposite side members and a fore-and-aft top element secured to the tops of the arch members; ground wheels sustaining the frame; handle means on and for guiding the frame; a cross shaft supported at opposite ends respectively in the side members; a yoke between the side members and having spaced apart legs mounted on the cross shaft and a rigid transverse bight portion rigidly interconnecting the legs rearwardly of the cross shaft; a rigid main arm secured at its front end to the bight portion and extending rearwardly therefrom to a terminal rear end; front and rear rotary means carried respectively on the cross shaft and the terminal rear end of the main arm; earth-working means including an endless element trained about the two rotary means; a power source on the frame; drive means interconnecting the power source and the earth-working means; an adjusting arm connected to the yoke for swinging the yoke, main arm and earth-working means as a unit about the axis of the cross shaft; and releasable means cooperative between said adjusting arm and the frame for securing selected vertical positions of said unit as comprising said yoke, main arm and earth-working means.

8. The invention defined in claim 7, in which: the cross shaft is fixed against turning in the frame; the legs of the yoke are journaled on the cross shaft; the front rotary means includes a sleeve journaled on the cross shaft between the legs of the yoke and a drive member coaxially fixed to said sleeve to carry the endless element as it passes around the axis of the cross shaft; and the drive means includes an input member coaxially fixed to the sleeve and driven by the power source.

References Cited in the file of this patent

UNITED STATES PATENTS

| | | |
|---|---|---|
| 351,701 | Humphreys | Oct. 26, 1886 |
| 717,530 | Bentson | Jan. 6, 1903 |
| 2,231,983 | Zuckerman | Feb. 18, 1941 |
| 2,584,287 | Przybylski | Feb. 5, 1952 |
| 2,599,778 | Przybylski | June 10, 1952 |
| 2,684,542 | Larson et al. | July 27, 1954 |
| 2,714,262 | Malzahn | Aug. 2, 1955 |
| 2,751,698 | Brown | June 26, 1956 |